No. 610,003. Patented Aug. 30, 1898.
J. E. SPERRY.
WEEDER.
(Application filed Feb. 12, 1898.)
(No Model.) 2 Sheets—Sheet 1.
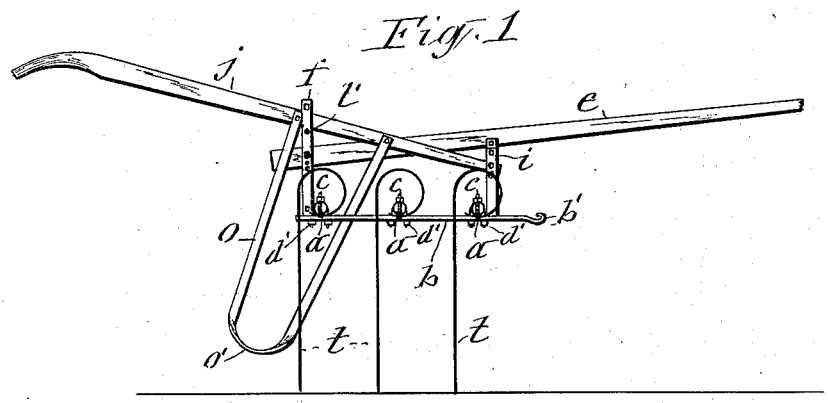
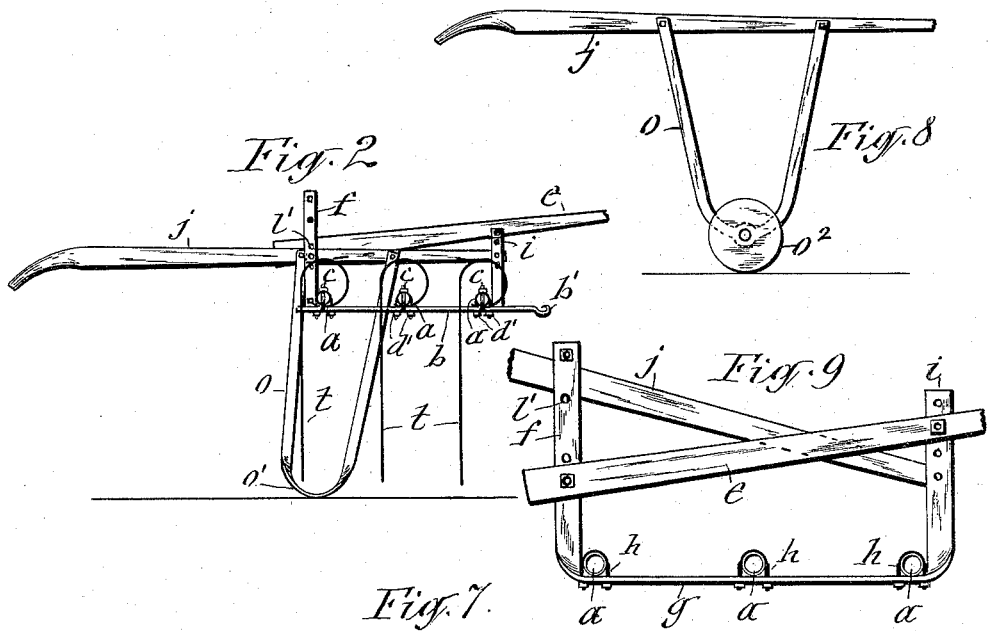
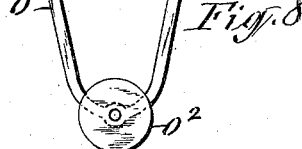
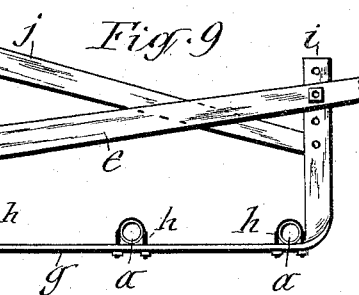
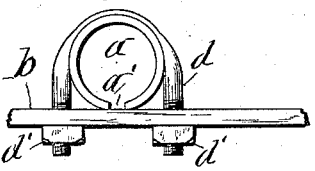
WITNESSES:
H. B. Smith
J. J. Laass
INVENTOR
John E. Sperry
By E. Laass
his ATTORNEY
THE NORRIS PETERS CO., PHOTO-LITHO., WASHINGTON, D. C.

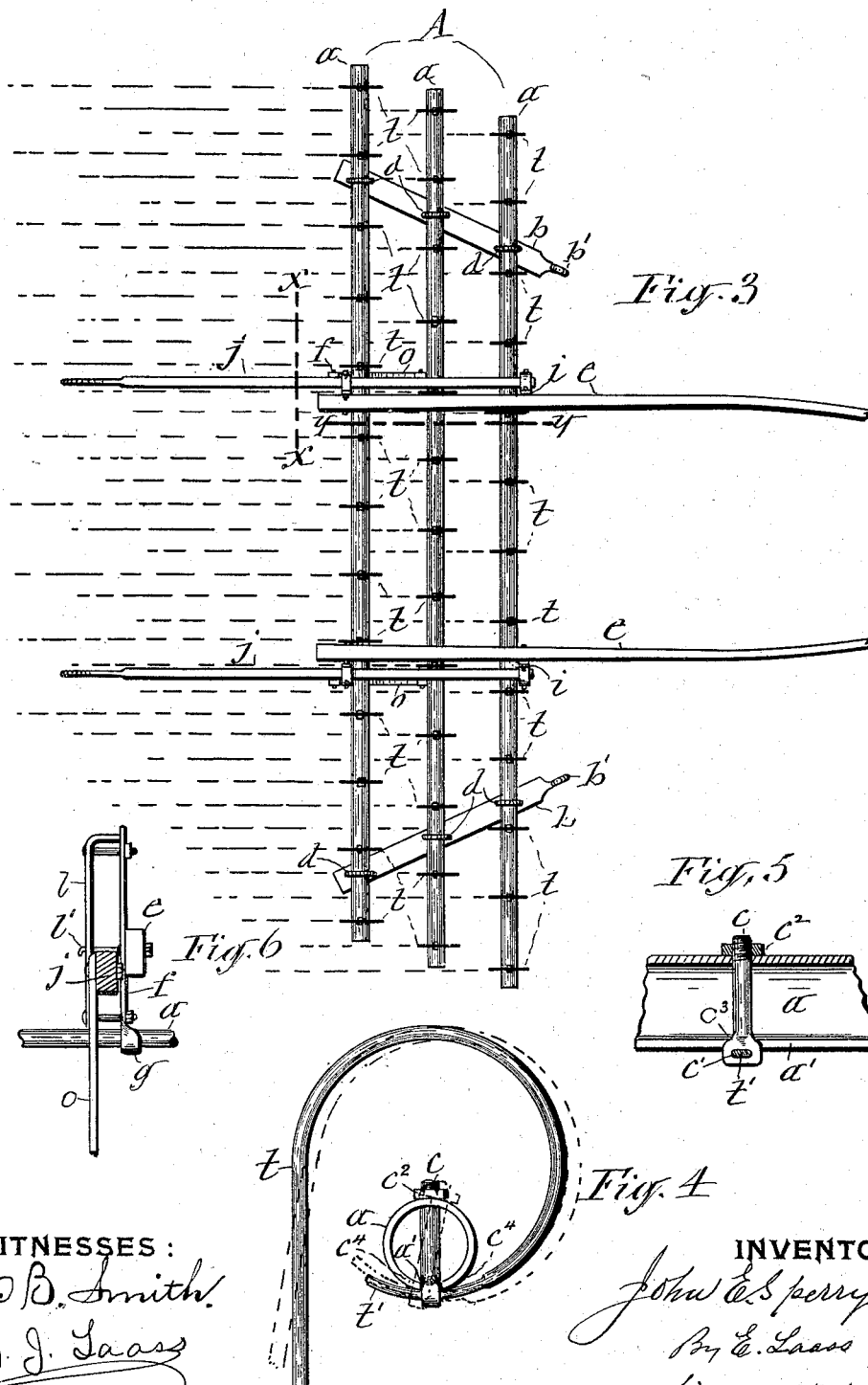

UNITED STATES PATENT OFFICE.

JOHN E. SPERRY, OF MUNNSVILLE, NEW YORK.

WEEDER.

SPECIFICATION forming part of Letters Patent No. 610,003, dated August 30, 1898.

Application filed February 12, 1898. Serial No. 670,033. (No model.)

*To all whom it may concern:*

Be it known that I, JOHN E. SPERRY, a citizen of the United States, and a resident of Munnsville, in the county of Madison, in the State of New York, have invented new and useful Improvements in Weeders, of which the following, taken in connection with the accompanying drawings, is a full, clear, and exact description.

This invention relates to the class of agricultural implements which are employed for tearing weeds out of cultivated ground.

The invention consists in improved construction and combination of the component parts of a weeding-machine which is simple, strong, and inexpensive in construction and adjustable and efficient in operation, as hereinafter more fully described.

In the annexed drawings, Figures 1 and 2 are side views of a weeding-machine embodying my invention and showing the same in different operative positions. Fig. 3 is a plan view of said machine. Fig. 4 is an enlarged end view of one of the tubular transverse bars with one of the teeth attached to it and showing the adjustment of the tooth. Fig. 5 is a longitudinal section of said bar. Fig. 6 is an enlarged vertical sectional view on line X X in Fig. 3. Fig. 7 is an enlarged end view of the aforesaid tubular bar, showing its attachment to the draft-bar. Fig. 8 illustrates a modification of my invention, and Fig. 9 is an enlarged vertical longitudinal section on line Y Y in Fig. 3.

Similar letters of reference indicate corresponding parts.

A denotes the frame of the machine, which frame is composed of a plurality of parallel bars $a\ a\ a$, disposed transversely in relation to the line of draft and united by longitudinal draft-bars $b\ b$. All of said transverse bars are of equal lengths and have the weeder-teeth $t\ t$ attached to them in the same relative positions, and thus the construction of the frame A is simplified and the cost of its manufacture reduced.

In order to cause the teeth $t\ t$ of the entire set to track at regular distances apart, as indicated by dotted lines in Fig. 3 of the drawings, the bars $a\ a\ a$ are arranged to bring their corresponding ends in straight lines oblique to the line of draft.

The front ends of the draft-bars $b\ b$ are formed with hooks $b'$ or other suitable devices for attaching directly thereto the tugs or traces of the harness on the horse drawing the machine. This direct attachment is made for the purpose of retaining the frame A in its requisite angle to the line of draft during the operation of the machine.

To combine maximum strength and durability with minimum weight in construction of the bars $a\ a\ a$, I form the same of metal tubes, which are slotted lengthwise, as shown at $a'$, for the purpose hereinafter explained.

The teeth $t$ are each formed of a flexible steel rod, the upper end of which is curved and extended from the tooth at the rear of the tube $a$ forward and over said tube and thence downward and terminated with a rearwardly-extending attaching-shank $t'$, which is flattened horizontally and inserted in a correspondingly-shaped slot $c'$, formed in one end of a bolt $c$, which passes transversely through the tube and has said slotted end protruding through the slot $a'$ of the tube. The opposite end of said bolt is provided with a nut $c^2$, by which to draw the slotted end of the bolt toward the tube, so as to cause the shank $t'$ of the tooth to be pressed tightly against the exterior of the tube, and thereby confine the shank in the slot $c'$. By loosening the said nut the shank $t'$ becomes released from the aforesaid pressure and is allowed to be slipped rearward or forward, as may be desired, to set the tooth a greater or less distance from the tube. The portion $c^3$ of the bolt $c$ adjacent to the slot $c'$ is flattened or elongated in the direction of the slot $a'$ and fitted closely therein to prevent the bolt from turning.

To allow the teeth $t$ to be set at different angles of inclination for causing them to serve either to cut into the ground or to smooth the ground, I connect the tubes $a\ a$ to the draft-bars $b$ and to other longitudinal bars hereinafter described by means of clips $d\ d$, which embrace or straddle the tubes and have their screw-threaded shanks passing through said bars and provided with nuts $d'$ for tightening the clip and firmly uniting the tubes with said bars. By loosening said nuts the clips release the tubes sufficiently to allow said tubes to be turned and thus cause the teeth $t$ to be adjusted to their desired angles of inclination, as aforesaid. In the operation of tightening said clips they become slightly compressed circumferentially and are thereby caused to press the edges of the slotted portion of the tube more firmly onto the shanks of the teeth $t$. Said portion of the tube forms two jaws $c^4 c^4$, which in the aforesaid operation, together with the tightening of the nuts $c^2 c^2$ on the bolt $c$, are caused to firmly grip the slotted ends of the bolt and the shanks of the teeth inserted in the slots of said bolt, as clearly shown in Fig. 4 of the drawings.

$e\ e$ represent the shafts or thills for the horse employed for drawing the machine. To allow said shafts to be adjusted for horses of different heights and cause said shafts to sustain the frame A in proper position to carry the lower ends of the teeth $t\ t$ in a plane parallel with the surface of the ground over which the machine is drawn, I pivot the rear end of each shaft to a bracket $f$ on the rear end of a longitudinal bar $g$, which is fastened to the tubular transverse bars $a\ a$ by means of clips $h$, as shown in Fig. 9 of the drawings. Said clips allow said bars to be turned for adjusting the teeth $t\ t$, as hereinbefore described. From the front end of the bar $g$ rises another bracket $i$, which is provided with a plurality of holes at different points in the height of the bracket, and by means of a bolt adapted to be shifted from one to another of said holes and passing through the same and through the shaft the latter is sustained in its required position.

$j\ j$ represent two hand-levers which are employed conjointly for two purposes—viz., for guiding the machine and for either raising the frame A, so as to lift the teeth completely from the ground in going to and from the field, or to support the said frame in a position to allow the teeth to either scrape or partly enter the ground. Each of said levers is pivoted at one end to one of the front brackets $i$ and extends with its free rearward end beyond the rear of the frame A. The rear or free ends of said levers pass through vertical guides $l$, attached to the brackets $f$, as shown in Fig. 6 of the drawings. Said brackets and guides are each provided with a plurality of holes for the reception of a pin or bolt $l'$ for confining the lever in its required elevation or depression.

To each of the levers $j$ is attached a downwardly-extending fulcrum $o$, preferably formed of a steel bar bent approximately V or U shaped and attached at its extremities to the lever directly over the frame A. The lower portion of said bar is either formed with a shoe or runner $o'$ or has pivoted to it a wheel $o^2$, as shown in Fig. 8 of the drawings.

To raise the frame A to carry the teeth completely from the ground, the rear ends of the levers $j\ j$ are to be depressed to bring the fulcrums thereof to bear on the ground and cause the frame to be lifted by the front ends of the levers. By releasing the rear ends of the levers from downward pressure the frame A is allowed to descend and become supported by the teeth $t\ t$ bearing on the ground, in which position the frame is to be placed for weeding the ground.

What I claim is—

1. A weeder-frame consisting of transverse bars carrying the weeder-teeth, and draft-bars uniting said transverse bars and terminated with direct tug attachments to retain said frame at its requisite angle to the line of draft as set forth.

2. A weeder-frame composed of metal tubes disposed transversely to the line of draft and provided with means for attaching the weeder-teeth, draft-bars extending across said tubes, and clips embracing the tubes and secured to the draft-bars by nuts to permit the tubes to be loosened and turned to carry the teeth at different angles of inclination as set forth.

3. In an agricultural implement, a tooth-carrier consisting of a metallic tube slotted longitudinally, a bolt passing transversely through said tube and provided with a nut on one end and having its opposite end passing through the slot of the tube and enlarged in the direction of said slot to prevent the bolt from turning and provided with a slot in its protruding portion, and a tooth inserted in said slot and retained by pressure against the exterior of the tube as set forth.

4. The combination of a tooth-carrying bar formed with compressible jaws, a tooth having its shank resting transversely on said jaws, and means for pressing said shank onto the jaws and simultaneously compressing said jaws as set forth.

5. The combination of a circumferentially-compressible metal tube slotted longitudinally, a bolt passing transversely through said tube and provided with a nut on one end and having its opposite end passing through the slot of the tube and enlarged in the direction of said slot and formed adjacent thereto with a horizontally-elongated eye, a tooth inserted in said eye and held in contact with the tube, and a clip embracing and compressing said tube as set forth.

6. The combination with the frame, of metal bars extending from the front to the rear of said frame and fastened thereto and each of said bars formed with vertical extensions at its ends and thills adjustably connected to said extensions as set forth.

7. The combination with the frame and a plurality of rows of teeth supporting said frame during the operation of said teeth, of levers pivoted to the frame and provided with fulcrums for lifting the frame as set forth.

8. The combination with the frame and a plurality of rows of teeth supporting the frame during the operation of said teeth, of levers pivoted to the frame and provided with fulcrums for lifting said frame, and brackets attached to the frame and provided with means for retaining the levers in their various required positions for raising and lowering the frame as set forth.

9. The combination with the frame and a plurality of rows of teeth supporting the frame during the operation of said teeth, of combined guiding and adjusting levers pivoted to the front part of the frame and extending with their free ends beyond the rear of the frame, fulcrums attached to said levers for lifting the frame, brackets attached to the frame and formed with vertical guides for the free ends of the levers, and means for retaining the free ends of the levers in their required positions for raising and lowering the frame as set forth.

JOHN E. SPERRY. [L. S.]

Witnesses:
J. J. LAASS,
H. B. SMITH.